Sept. 17, 1929.  H. PFANNENSTIEHL  1,728,304
FILM DRIVE MECHANISM
Filed May 21, 1927   2 Sheets-Sheet 2
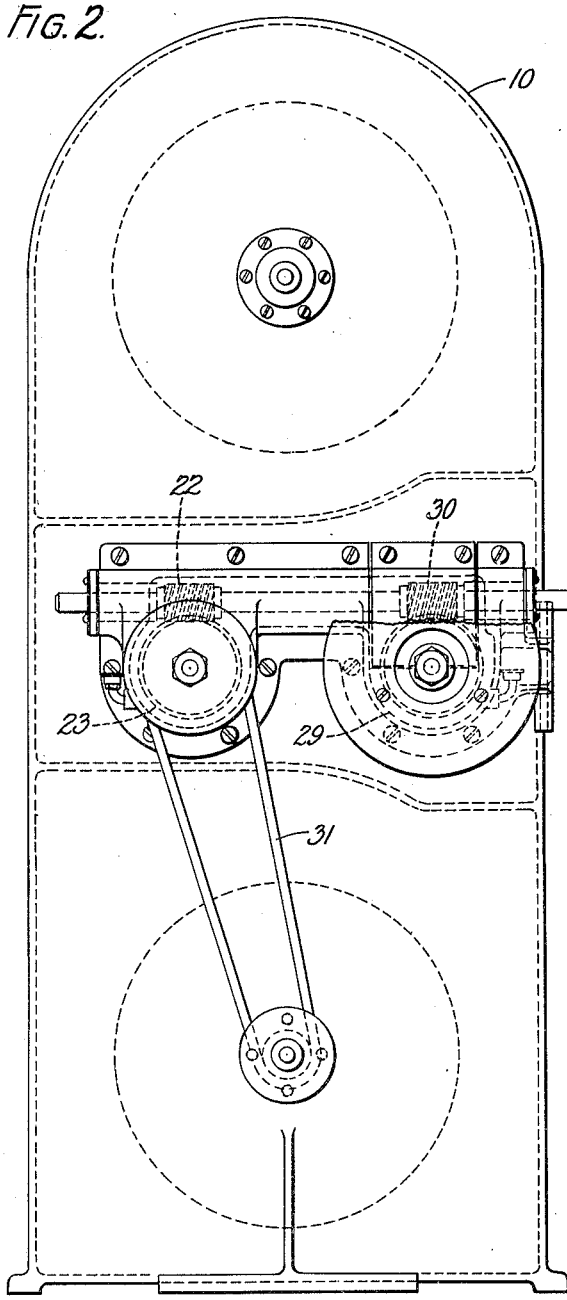
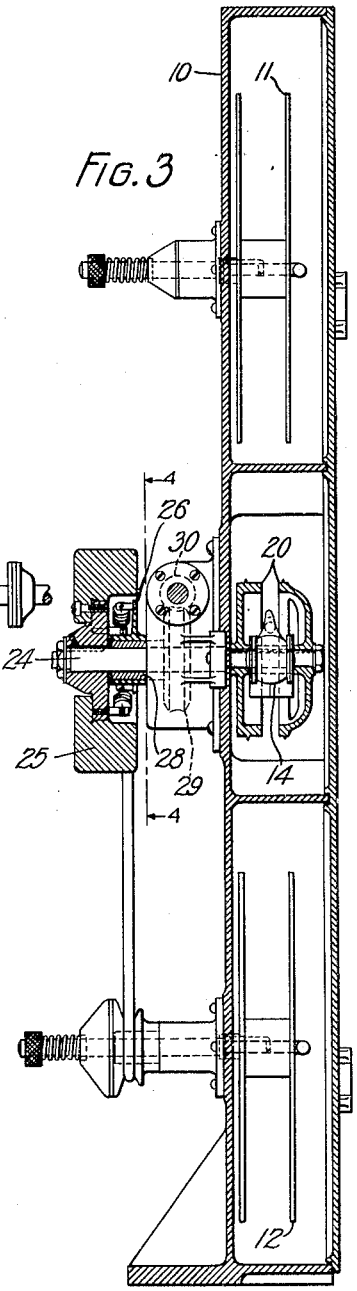
INVENTOR
HARRY PFANNENSTIEHL
BY
ATTORNEY Patented Sept. 17, 1929

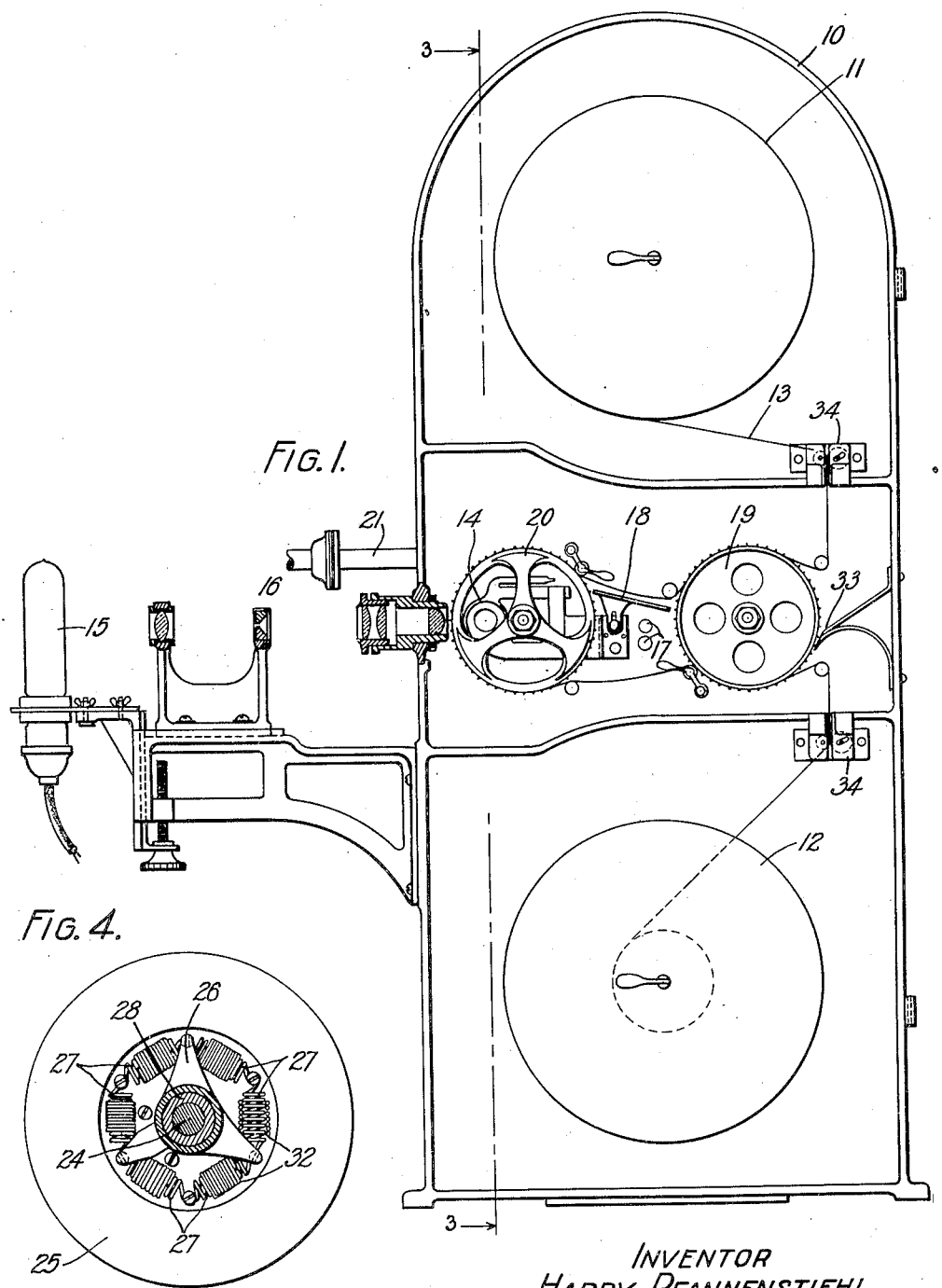

1,728,304

UNITED STATES PATENT OFFICE

HARRY PFANNENSTIEHL, OF MAPLEWOOD, NEW JERSEY, ASSIGNOR TO BELL TELEPHONE LABORATORIES, INCORPORATED, OF NEW YORK, N. Y., A CORPORATION OF NEW YORK

FILM-DRIVE MECHANISM

Application filed May 21, 1927. Serial No. 193,372.

This invention relates to film drives and particularly drives for films for sound recording and reproducing systems.

An object of the invention is to obtain a constant speed drive for films.

In sound recording and reproducing systems it is necessary that the record be driven at a constant speed since variations in the speed produce disagreeable disturbances in the reproduced sound. Therefore, when a film is employed for recording or reproducing sound waves, it is necessary to drive the film past the control elements at a constant speed. Obviously the load on the portions of the film drive apparatus which unwind the film from the mounting reel and feed it to the take-up reel varies considerably from time to time and such variations in load tend to produce fluctuations in the speed of the film driving mechanism.

In a preferred embodiment, this invention comprises a sound recording or reproducing device having a drive mechanism consisting of a sprocket wheel directly coupled to a driving motor to draw the film from the reel and a second sprocket wheel coupled to the motor through a vibrational damping means for driving the film past the control point. The film is also fed to the take-up reel by the first sprocket and allowed to run slack between the sprockets so that all the load of drawing the film from the reel and of the pull of the take-up reel is carried by the first sprocket. The vibrational damping means comprises a fly wheel directly connected to the second sprocket and coupled through elastic elements to the driving motor. This arrangement maintains the speed of the driving sprocket constant regardless of minor fluctuations in the motor's speed.

Obviously this invention is not limited to the particular embodiment described. For example, it is equally applicable to drives for any linear record of tape or wire type.

The invention is illustrated in the accompanying drawing which shows an embodiment thereof in an apparatus for reproducing sound photographically recorded on a film.

Fig. 1 showing a front elevation with the door open;

Fig. 2, a rear elevation;

Fig. 3, a section along the line 3—3 of Fig. 1; and

Fig. 4, a detailed section along the line 4—4 of Fig. 3.

The reproducer shown in the drawing comprises a case 10 in which the film drive mechanism is mounted. The film 13 is drawn from a feed reel 11 and driven past a photo-electric cell 14 and fed onto a take-up reel 12. The film is run through the usual tensioning devices 34. A beam of light from the lamp 15 is focused on the photo-electric cell 14 through an optical system 16. The effect of this beam on the photo-electric cell is controlled by the record on the film 13. Holes 17 are made in the case 10 so that connections may be made from the photo-electric cell to an electrical circuit for reproducing the sound waves recorded on the film. A grounded shield 18 is provided for shielding these leads from the electro-static charges which may accumulate on the film as a result of peeling it off the feed reel 11.

The driving mechanism comprises two sprocket wheels 19 and 20 which are driven by the shaft 21. The sprocket 19 is directly driven by a motor (not shown) through the drive shaft 21, worm 22 and worm gear 23. The sprocket 20 is mounted on one end of a shaft 24, on the other end of which is mounted a flywheel 25. The flywheel is connected to a spider 26 by means of springs 27. The spider is rigidly mounted on one end of a sleeve 28 which surrounds the shaft 24. A worm gear 29 mounted on the other end of this sleeve is driven by a worm 30 mounted on the driving shaft 21.

The film 13 is pulled from the feed reel 11 my the positively driven sprocket wheel 19 and driven past the photo-electric cell 14 by the constant speed sprocket wheel 20, after which it is again fed over the sprocket 19 to the take-up reel 12 which is driven by a belt 31. The springs 27 and the flywheel 25 act as a vibrational damping means thus preventing the speed of the sprocket wheel 20 from being effected by any variations in the speed of the driving shaft 21 which may be produced by fluctuations in the speed of the driving motor or by variations in the load on the feed sprocket 19. In order to further eliminate variations in the speed of the sprocket 20 each of the springs 27 is surrounded by a damping spring 32, which further tends to eliminate vibrations. The film is allowed to run slack between the sprocket wheels 19 and 20, so that the instantaneous speed of the wheel 19 may vary without effecting the wheel 20 through the film.

The sprocket wheel 20 is split and the photo-electric cell 14 is mounted inside of it so that the film will be directly driven past the control point. A shield 33 arranged tangential to the sprocket wheel 19 is provided to prevent the film from winding around the circumference of the wheel in case of a break.

While the invention is illustrated in connection with a reproducer, obviously it may be used to equal advantage in a recorder.

What is claimed is:

1. A constant speed film drive comprising a sprocket wheel, a second sprocket wheel, a source of power common to both wheels, and means interposed between said first sprocket and said source of power to insure a constant speed of the film over said first sprocket.

2. In a constant speed film drive, a sprocket wheel, a second sprocket wheel, a source of power common to both wheels, and means to insure the constant speed of the film over said first sprocket wheel comprising a fly wheel connected to said first sprocket wheel, and elastic means coupling said first sprocket wheel to said source of power.

3. A constant speed film drive comprising a pair of sprocket wheels, a common source of power for both wheels, means interposed between one of said sprockets and said source of power to insure a constant speed of the film over said sprocket wheel, the other of said sprocket wheels adapted to feed the film to and draw the film from said first sprocket wheel.

4. In a sound recorder or reproducer having film feeding and film winding reels, a constant speed film drive comprising a source of power, a sprocket wheel, means interposed between said sprocket wheel and said source of power to insure a constant speed of the film over said sprocket wheel, a second sprocket wheel connected to said source of power and adapted to control the movement of the film to and from said first sprocket wheel, said second sprocket wheel having a driving connection to said film winding reel.

5. In a constant speed film drive, a source of power, a sprocket wheel, a flywheel connected to said sprocket wheel, elastic means coupling said sprocket wheel to said source of power, and means to control the movement of the film to and from said first sprocket wheel, said means comprising a second sprocket wheel connected to said source of power, one portion of said second wheel feeding the film to said first sprocket and the other portion of said second wheel drawing the film from said first sprocket.

6. In a constant speed film drive, a source of power, a sprocket wheel, a second sprocket wheel connected to said power source adapted to control the movement of the film to and from said first sprocket, a flywheel connected to said first sprocket, elastic means coupling said sprocket to said source of power, and means for insuring the unretarded passage of the film to said first sprocket, by allowing the film to run slack between the sprocket wheels both on the feed and take-up sides.

7. In combination, a control element, a film, a reel for mounting said film, a reel for winding said film, a source of power having a substantially constant average speed, a sprocket wheel engaging said film for driving it past said control element, a second sprocket wheel driven by said source and engaging said film to draw it from said first reel and feed it to said second reel, a fly wheel connected to said first sprocket, and elastic means coupling said first sprocket to said source of power.

8. In a sound recorder or reproducer having both film mounting and film winding reels and an element for controlling a beam of light in response to electrical variations or vice versa, a constant speed film drive, comprising a source of power having a substantially constant speed, a sprocket wheel, engaging the film for driving it past said control elements, a flywheel connected to said sprocket, elastic means coupling said sprocket wheel to said source of power, a second sprocket wheel connected to said power source and engaging the film to feed it from the mounting reel to said first sprocket wheel and to draw it from said first sprocket to said take-up reel, said second sprocket having a driving connection to said film winding reel.

In witness whereof, I hereunto subscribe my name this 18th day of May A. D. 1927.

HARRY PFANNENSTIEHL.